US006968564B1

(12) United States Patent
Srinivasan

(10) Patent No.: US 6,968,564 B1
(45) Date of Patent: Nov. 22, 2005

(54) MULTI-BAND SPECTRAL AUDIO ENCODING

(75) Inventor: Venugopal Srinivasan, Palm Harbor, FL (US)

(73) Assignee: Nielsen Media Research, Inc., New York, NY (US)

( * ) Notice: Subject to any disclaimer, the term of this patent is extended or adjusted under 35 U.S.C. 154(b) by 0 days.

(21) Appl. No.: 09/543,480

(22) Filed: Apr. 6, 2000

(51) Int. Cl.[7] .......................... H04H 9/00; H04N 7/16

(52) U.S. Cl. .............................. 725/9; 381/97; 725/19

(58) Field of Search .............................. 725/18, 19, 14, 725/9; 455/2.01; 379/93.98, 93.28, 100.65; 380/235, 252, 236, 237; 704/500–504; 348/484; 381/97

(56) References Cited

U.S. PATENT DOCUMENTS 2,573,279 A 10/1951 Scherbatskoy ............... 346/37
2,630,525 A 3/1953 Tomberlin et al. ............. 250/6
2,766,374 A 10/1956 Hoffmann ...................... 250/2
2,982,813 A 5/1961 Hathaway
3,004,104 A 10/1961 Hembrooke ................... 179/2
3,492,577 A 1/1970 Reiter et al. .................. 325/31
3,684,838 A 8/1972 Kahn
3,696,298 A 10/1972 Kahn et al.
3,733,460 A 5/1973 Thompson et al.
3,735,048 A 5/1973 Tomsa et al.
3,760,275 A 9/1973 Ohsawa et al. ............... 325/31
3,845,391 A 10/1974 Crosby ........................ 325/64
4,025,851 A 5/1977 Haselwood et al. .......... 325/31
4,134,127 A 1/1979 Campioni
4,225,967 A 9/1980 Miwa et al. .................. 455/68
4,238,849 A 12/1980 Gassmann ................... 370/11
4,313,197 A 1/1982 Maxemchuk ............... 370/111
4,379,947 A 4/1983 Warner
4,425,642 A 1/1984 Moses et al. ................. 370/76
4,425,661 A 1/1984 Moses et al.
4,512,013 A 4/1985 Nash et al. ................ 370/69.1
4,523,311 A 6/1985 Lee et al. .................. 370/69.1

(Continued)

FOREIGN PATENT DOCUMENTS

EP 0 243 561 11/1987 .......... H04Q 1/457

(Continued)

OTHER PUBLICATIONS

"Digital Audio Watermarking, " Audio Media, Jan./Feb. 1998, pp. 56, 57, 59, and 61.

(Continued)

*Primary Examiner*—John Miller
*Assistant Examiner*—James Sheleheda
(74) *Attorney, Agent, or Firm*—Hanley, Flight & Zimmerman LLC

(57) ABSTRACT

An encoder includes a sampler that samples an audio signal and that generates from the samples a plurality of short blocks of sampled audio. Each of the short blocks has a duration less than a minimum audibly perceivable signal delay. A processor combines the plurality of short blocks into a long block. The long block is transformed into a frequency domain signal having a plurality of independently modulatable frequency indices. The frequency difference between adjacent indices is determined by the minimum duration and the sampling rate of the sampler. A neighborhood of frequency indices is selected so that the frequency difference between a lowest index and a highest index within the neighborhood is less than a predetermined value. Two or more of the indices are modulated in the neighborhood so as to make a selected one of the indices an extremum while keeping the total energy of the neighborhood constant. A plurality of frequency bands are so coded. A decoder decides that a bit or bits have been received if, in a majority of the frequency bands, the decoder detects a modulated index.

14 Claims, 3 Drawing Sheets

U.S. PATENT DOCUMENTS

| | | | | |
|---|---|---|---|---|
| 4,652,915 | A | 3/1987 | Heller, III | |
| 4,677,466 | A * | 6/1987 | Lert et al. | 725/22 |
| 4,688,255 | A | 8/1987 | Kahn | |
| 4,697,209 | A | 9/1987 | Kiewit et al. | 358/84 |
| 4,703,476 | A | 10/1987 | Howard | 370/76 |
| 4,750,053 | A | 6/1988 | Allen | |
| 4,750,173 | A | 6/1988 | Bluthgen | 370/111 |
| 4,771,455 | A | 9/1988 | Hareyama et al. | 380/6 |
| 4,876,617 | A | 10/1989 | Best et al. | 360/60 |
| 4,931,871 | A | 6/1990 | Kramer | 358/142 |
| 4,943,973 | A | 7/1990 | Werner | 375/1 |
| 4,945,412 | A | 7/1990 | Kramer | 358/142 |
| 4,956,709 | A | 9/1990 | Richer et al. | |
| 4,972,471 | A | 11/1990 | Gross et al. | 380/3 |
| 5,079,647 | A | 1/1992 | Nenezu et al. | |
| 5,113,437 | A | 5/1992 | Best et al. | 380/3 |
| 5,212,551 | A | 5/1993 | Conanan | |
| 5,213,337 | A | 5/1993 | Sherman | 273/439 |
| 5,227,874 | A | 7/1993 | Von Kohorn | |
| 5,285,498 | A | 2/1994 | Johnston | |
| 5,319,735 | A | 6/1994 | Preuss et al. | 395/2.14 |
| 5,355,161 | A * | 10/1994 | Bird et al. | 725/22 |
| 5,379,345 | A | 1/1995 | Greenberg | 380/23 |
| 5,394,274 | A | 2/1995 | Kahn | 360/27 |
| 5,404,377 | A | 4/1995 | Moses | 375/200 |
| 5,450,490 | A | 9/1995 | Jensen et al. | 380/6 |
| 5,463,423 | A | 10/1995 | Tults | |
| 5,473,631 | A | 12/1995 | Moses | 375/202 |
| 5,481,370 | A | 1/1996 | Kim | |
| 5,534,941 | A | 7/1996 | Sie et al. | |
| 5,535,300 | A | 7/1996 | Hall, II et al. | |
| 5,550,593 | A | 8/1996 | Nakabayashi | |
| 5,574,962 | A | 11/1996 | Fardeau et al. | 455/2 |
| 5,574,963 | A | 11/1996 | Weinblatt et al. | |
| 5,579,124 | A | 11/1996 | Aijala et al. | 386/96 |
| 5,581,800 | A | 12/1996 | Fardeau et al. | 455/2 |
| 5,583,962 | A * | 12/1996 | Davis et al. | 704/229 |
| 5,594,934 | A | 1/1997 | Lu et al. | 455/2 |
| 5,629,739 | A | 5/1997 | Dougherty | 348/486 |
| 5,668,805 | A | 9/1997 | Yoshinobu | |
| 5,675,388 | A | 10/1997 | Cooper | |
| 5,687,191 | A | 11/1997 | Lee et al. | 375/216 |
| 5,689,822 | A | 11/1997 | Zucker | |
| 5,699,124 | A | 12/1997 | Nuber et al. | |
| 5,703,877 | A | 12/1997 | Nuber et al. | |
| 5,719,937 | A | 2/1998 | Warren et al. | |
| 5,731,841 | A | 3/1998 | Rosenbaum et al. | |
| 5,745,604 | A | 4/1998 | Rhoads | |
| 5,757,417 | A | 5/1998 | Aras et al. | |
| 5,761,606 | A | 6/1998 | Wolzien | |
| 5,764,763 | A * | 6/1998 | Jensen et al. | 380/253 |
| 5,768,426 | A | 6/1998 | Rhoads | |
| 5,768,680 | A * | 6/1998 | Thomas | 455/2.01 |
| 5,774,452 | A | 6/1998 | Wolosewicz | |
| 5,787,334 | A | 7/1998 | Fardeau et al. | 455/2 |
| 5,808,689 | A | 9/1998 | Small | |
| 5,822,360 | A | 10/1998 | Lee et al. | 375/200 |
| 5,822,436 | A | 10/1998 | Rhoads | |
| 5,826,165 | A | 10/1998 | Echeita et al. | |
| 5,832,119 | A | 11/1998 | Rhoads | 382/232 |
| 5,850,481 | A | 12/1998 | Rhoads | |
| 5,856,973 | A | 1/1999 | Thompson | |
| 5,930,369 | A | 7/1999 | Cox et al. | 380/54 |
| 6,035,177 | A | 3/2000 | Moses et al. | 455/2 |
| 6,151,578 | A * | 11/2000 | Bourcet et al. | 704/500 |
| 6,253,185 | B1 | 6/2001 | Arean et al. | |
| 6,266,430 | B1 | 7/2001 | Rhoads | |
| 6,286,100 | B1 | 9/2001 | Morimoto et al. | 713/176 |
| 6,304,966 | B1 | 10/2001 | Shimizu | 713/100 |
| 6,308,150 | B1 | 10/2001 | Neo et al. | |
| 6,338,037 | B1 | 1/2002 | Todd et al. | |
| 6,349,284 | B1 | 2/2002 | Park et al. | |
| 6,353,672 | B1 | 3/2002 | Rhoads | |
| 6,359,573 | B1 | 3/2002 | Taruguchi et al. | 341/50 |
| 6,385,329 | B1 | 5/2002 | Sharma et al. | 382/100 |
| 6,389,055 | B1 | 5/2002 | August et al. | 375/130 |
| 6,421,445 | B1 * | 7/2002 | Jensen et al. | 380/253 |
| 6,512,796 | B1 * | 1/2003 | Sherwood | 375/242 |
| 6,519,769 | B1 | 2/2003 | Hopple et al. | |
| 6,574,350 | B1 | 6/2003 | Rhoads et al. | |
| 6,584,138 | B1 | 6/2003 | Neubauer et al. | |
| 2001/0055398 | A1 | 12/2001 | Pachet et al. | |
| 2002/0006203 | A1 | 1/2002 | Tachibana et al. | |
| 2002/0010919 | A1 | 1/2002 | Lu et al. | |
| 2002/0055398 | A1 | 5/2002 | Halko | |

FOREIGN PATENT DOCUMENTS

| | | | |
|---|---|---|---|
| EP | 0 535 893 | 4/1993 | G06F 15/332 |
| GB | 2 170 080 | 7/1986 | H04N 5/04 |
| GB | 2 260 246 | 4/1993 | H04N 1/00 |
| GB | 2 260 246 A | 4/1993 | H04H 1/00 |
| GB | 2 292 506 | 2/1996 | H04N 1/00 |
| JP | 07 059030 | 3/1995 | |
| JP | 09 009213 | 1/1997 | |
| WO | WO 89/09985 | 10/1989 | G10L 5/00 |
| WO | WO 93/07689 | 4/1993 | H04B 17/00 |
| WO | WO 94/11989 | 5/1994 | H04N 5/76 |
| WO | WO 96/38927 | 12/1996 | H04B 1/66 |
| WO | WO 01/296991 | 4/2001 | |
| WO | WO 01/78271 A2 | 10/2001 | |
| WO | WO 02/49363 | 6/2002 | |

OTHER PUBLICATIONS

International Search Report, dated Aug. 27, 1999, Application No. PCT/US/98/23558.

Namba, S. et al., "A Program Identification Code Transmission System Using Low-Frequency Audio Signals," NHK Laboratories Note, Ser. No. 314, Mar. 1985.

Steele, R. et al., "Simultaneous Transmission of Speech and Data Using Code-Breaking Techniques," The Bell System Tech. Jour., vol. 60, No. 9, pp. 2081-2105, Nov. 1981.

International Search Report, dated Aug. 18, 2000, Application No. PCT/US00/03829.

* cited by examiner

MULTI-BAND SPECTRAL AUDIO ENCODING

RELATED APPLICATION

This application contains disclosure similar to the disclosure in U.S. patent application Ser. No. 09/116,397 filed Jul. 16, 1998, in U.S. patent application Ser. No. 09/427,970 filed Oct. 27, 1999, and in U.S. patent application Ser. No. 09/428,425 filed Oct. 27, 1999.

TECHNICAL FIELD OF THE INVENTION

The present invention relates to a system and method for adding an inaudible code to an audio signal and for subsequently retrieving that code. Such a code may be used, for example, in an audience measurement application in order to identify a broadcast program.

BACKGROUND OF THE INVENTION

There are many arrangements for adding an ancillary code to a signal in such a way that the added code is not noticed. For example, it is well known in television broadcasting that ancillary codes can be hidden in non-viewable portions of video by inserting the codes into either the video's vertical blanking interval or the video's horizontal retrace interval. An exemplary system that hides codes in non-viewable portions of video is referred to as "AMOL" and is taught in U.S. Pat. No. 4,025,851. This system is used by the assignee of the present application in order to monitor broadcasts of television programming as well as the times of such broadcasts.

Other known video encoding systems have sought to bury ancillary codes in a portion of a television signal's transmission bandwidth that otherwise carries little signal energy. Dougherty in U.S. Pat. No. 5,629,739, which is assigned to the assignee of the present application, discloses an example of such a system.

It is also known to add ancillary codes to audio signals for the purpose of identifying the signals and, perhaps, for tracing their courses through signal distribution chains. Audio encoding has the obvious advantage of being applicable not only to television, but also to radio broadcasts and to prerecorded music. Moreover, the speaker of a receiver reproduces, in the audio signal output, the ancillary codes that are added to audio signals. Accordingly, audio encoding offers the possibility of non-intrusive interception (i.e., interception of the codes without intrusion into the interior of the receiver) and of decoding the codes with equipment that has microphones as inputs. Moreover, audio encoding permits the measurement of broadcast audiences by the use of portable metering equipment carried by panelists.

In the field of audio signal encoding for broadcast audience measurement purposes, Crosby, in U.S. Pat. No. 3,845,391, teaches an audio encoding approach in which the code is inserted in a narrow frequency "notch" from which the original audio signal is deleted. The notch is made at a fixed predetermined frequency (e.g., 40 Hz). This approach leads to codes that are audible when the original audio signal containing the code is of low intensity.

A series of improvements followed the Crosby patent. Thus, Howard, in U.S. Pat. No. 4,703,476, teaches the use of two separate notch frequencies for the mark and the space portions of a code signal. Kramer, in U.S. Pat. Nos. 4,931,871 and in U.S. Pat. No. 4,945,412 teaches, inter alia, using a code signal having an amplitude that tracks the amplitude of the audio signal to which the code is added.

Broadcast audience measurement systems in which panelists are expected to carry microphone-equipped audio monitoring devices that can pick up and store inaudible codes broadcast in an audio signal are also known. For example, Aijalla et al., in WO 94/11989 and in U.S. Pat. No. 5,579,124, describe an arrangement in which spread spectrum techniques are used to add a code to an audio signal. The code is either not perceptible, or can be heard only as low level "static" noise.

Also, Jensen et al., in U.S. Pat. No. 5,450,490, teach an arrangement for adding a code at a fixed set of frequencies and using one of two masking signals. The choice of masking signal is made on the basis of a frequency analysis of the audio signal to which the code is to be added. Jensen et al. do not teach arrangements for selecting a maximum acceptable code energy to be used in each of a predetermined set of frequency intervals, nor do Jensen et al. teach energy exchange coding which transfers energy between spectral components and which thereby holds the total acoustic energy constant.

Preuss et al., in U.S. Pat. No. 5,319,735, teach a multiband audio encoding arrangement in which a spread spectrum code is inserted in recorded music at a fixed ratio to the input signal intensity (code-to-music ratio) that is preferably 19 dB. Lee et al., in U.S. Pat. No. 5,687,191, teach an audio coding arrangement suitable for use with digitized audio signals. The code intensity is made to match the input signal by calculating a signal-to-mask ratio in each of several frequency bands and by then inserting the code at an intensity that is a predetermined ratio of the audio input in that band. Lee et al. has also described a method of embedding digital information in a digital waveform in U.S. Pat. No. 5,824,360.

Jensen et al., in U.S. Pat. No. 5,764,763, teach a method in which code signals consisting of sinusoidal waves at ten pre-selected frequencies in a high resolution spectrum are added to the original audio in order to represent either a binary bit (0 or 1) and the start and end of an embedded message. Forty unique frequencies are required for encoding these four symbols. Their values range from 1046.9 Hz to 2851.6 Hz in a typical practical embodiment. The frequency separation between adjacent lines in the spectrum is 4 Hz and the minimum separation between frequencies selected to constitute the set of 40 frequencies is 8 Hz. The amplitude of the injected code signal is controlled by a masking analysis. In the decoding process, the injected code signal is distinguished by the fact that its level will be significantly above a noise level computed for a band of frequencies.

It will be recognized that, because ancillary codes are preferably inserted at low intensities in order to prevent the codes from distracting a listener of program audio, such codes may be vulnerable to various signal processing operations as well as to interference from extraneous electromagnetic sources. For example, although Lee et al. discuss digitized audio signals, many of the earlier known approaches to encoding a broadcast audio signal are not compatible with current and proposed digital audio standards, particularly those employing signal compression methods that may reduce the signal's dynamic range (and thereby delete a low level code) or that otherwise may damage an ancillary code. In this regard, it is particularly important for an ancillary code to survive compression and subsequent de-compression by the AC-3 algorithm or by one of the algorithms recommended in the ISO/IEC 11172

MPEG standard, which is expected to be widely used in future digital television broadcasting systems.

U.S. patent application Ser. No. 09/116,397 filed Jul. 16, 1998 and U.S. patent application Ser. No. 09/428,425 filed Oct. 27, 1999 disclose a system and method for inserting a code into an audio signal so that the code is likely to survive compression and decompression as required by current and proposed digital audio standards. Spectral modulation of the amplitude or phase of the signal at selected code frequencies is used to insert the code into the audio signal. These selected code frequencies, which could comprise multiple frequency sets within a given audio block, may be varied from audio block to audio block, and the spectral modulation may be implemented as amplitude modulation, modulation by frequency swapping, phase modulation, and/or odd/even index modulation. Moreover, an approach is taught to measuring audio quality of each block and of suspending encoding in cases where the code might be audible to a listener.

In experimental systems of the sort taught in the '397 application and in the '425 application, the audio sampling process during encoding imposes a delay in excess of twenty milliseconds in the audio portion of a television program. Left uncorrected, this delay results in a perceptible loss of synchronization between the audio and video portions of a viewed program. Hence, practical systems of this sort have required the use of a compensating video delay circuit. However, it is preferable to do without such a circuit.

Moreover, in systems of the sort taught in the '397 application and in the '425 application, codes are added by manipulating pairs of frequencies that are spaced apart by about 100 Hz. These systems are thus vulnerable to interference, such as reverberation or multi-path distortion, that affect one of the encoded frequencies substantially more than the other.

The present invention is arranged to solve one or more of the above noted problems.

SUMMARY OF THE INVENTION

According to one aspect of the present invention, a system for adding an interference-resistant, inaudible code to an audio signal comprises a sampler, a processor, a frequency transformation, a frequency selector, and an encoder. The sampler is arranged to sample the audio signal at a sampling rate and to generate therefrom a plurality of short blocks of sampled audio, where each of the short blocks has a duration less than a minimum audibly perceivable signal delay. The processor is arranged to combine the plurality of short blocks into a long block having a predetermined minimum duration. The frequency transformation is arranged to transform the long block into a frequency domain signal comprising a plurality of independently modulatable frequency indices, where a frequency difference between two adjacent ones of the indices is determined by the minimum duration and the sampling rate. The frequency selector is arranged to select a neighborhood of frequency indices so that the frequency difference between a lowest index and a highest index within the neighborhood is less than a predetermined value. The encoder is arranged to modulate two or more of the indices in the neighborhood so as to make a selected one of the indices an extremum while keeping the total energy of the neighborhood constant.

According to another aspect of the present invention, a method is provided to add a code to a frequency band of a sampled audio portion of a composite signal without thereby introducing a perceptible delay between the encoded audio portion and another portion of the composite signal. The method comprises the steps of: a) selecting a sampling rate and a frequency difference between adjacent ones of a predetermined number of frequency indices included in a frequency neighborhood; b) determining from the sampling rate and from the frequency difference a duration of a block of samples; c) determining an integral number of sequential sub-blocks to make up the block, where the integral number is selected so that each of the sub-blocks has a sub-block duration less than the perceptible delay; d) processing the block so as to modulate a selected one of the frequency indices without changing a total signal energy of the band.

According to still another aspect of the present invention, an apparatus is provided to read a code from an audio signal. The code comprises a sequence of blocks having a predetermined number of samples of the audio signal, and the code comprises a synchronization block followed by a predetermined number of data blocks. The apparatus comprises a buffer memory, a frequency transformation, a processor, and a vote determiner. The buffer memory is arranged to hold one of the blocks. The frequency transformation is arranged to transform the one block into spectral data spanning a predetermined number of frequency bands, where each of the frequency bands comprises a respective neighborhood of frequency indices. The processor is arranged to determine, for each of the neighborhoods, if a respective predetermined one of the frequency indices is modulated. The vote determiner is arranged to determine that the one block is the synchronization block if, in a majority of the frequency bands, the respective modulated frequency index is a respective index selected for inclusion in the synchronization block. The processor is further arranged to determine if, in one of the data blocks received subsequent to the synchronization block, a respective predetermined one of the frequency indices is modulated. The vote determiner is further arranged to determine if, in a majority of the frequency bands, the respective modulated frequency index is a respective index selected for inclusion in the one data block.

According to yet another aspect of the present invention, a method is provided to read a code from an audio signal by sequentially transforming a sequence of blocks of audio samples into spectral data spanning a predetermined number of frequency bands. Each of the frequency bands comprises a predetermined number of frequency indices, and each of the blocks comprises a predetermined number of the samples. The code comprises a synchronization block followed by a predetermined number of data blocks. The method comprises the steps of: a) determining, in each of the frequency bands of one of the blocks of audio samples, if one of the frequency indices is modulated; b) comparing each modulated frequency index found in step a) with that index selected for modulation in the respective frequency band of the synchronization block; c) determining that the one block is the synchronization block if the majority of the comparisons made in step b) result in a match, and otherwise repeating steps a) through b); d) determining, in each of the frequency bands of one of the data blocks received subsequent to the synchronization block, if a respective one of the frequency indices is modulated; and, e) comparing the respective modulated frequency indices found in step d) with ones of a plurality of predetermined index patterns, each of the index patterns uniquely associated with a respective code bit, and reading the code bit only if the majority of modulated indices match the predetermined index pattern.

According to a further aspect of the present invention, a system for adding an inaudible code to a tone-like audio portion of a composite signal having two or more portions comprises a sampling apparatus, a processor, a frequency transformation, an encoder, a signal analyzer, and an encoder suspender. The sampling apparatus is arranged to sample audio at a sampling rate and to generate therefrom a plurality of short blocks of sampled audio, where each of the short blocks has a duration less than a minimum audibly perceptible signal delay. The processor is arranged to combine the plurality of short blocks into a long block having a predetermined minimum duration. The frequency transformation is arranged to transform the long block into a frequency domain signal comprising a plurality of independently modulatable frequency indices located in a plurality of frequency bands. The encoder is arranged to modulate two or more of the indices in each of the frequency bands so as to make a respective selected one of the indices an extremum while keeping a total acoustic energy of the audio constant. The signal analyzer is arranged to determine if the tone-like audio portion has a tone-like character within any one of the predetermined number of neighborhoods. The encoder suspender is arranged to suspend the encoding of the encoder within any neighborhood in which the tone-like audio portion has a tone-like character.

According to yet a further aspect of the present invention, a method is provided to add an inaudible code to at least one of a predetermined number of frequency neighborhoods within a tone-like audio portion of a composite signal having one or more additional portions. The method comprises the steps of: a) sampling the audio portion and generating from the sampled signal a plurality of short blocks, each of the short blocks having a duration less than a minimum audibly perceptible signal delay; b) combining the plurality of short blocks into a long block having a predetermined minimum duration; c) transforming the long block into a frequency domain signal comprising a plurality of independently modulatable frequency indices; d) identifying those neighborhoods, if any, of the predetermined number of frequency neighborhoods in which the tone-like audio portion has a tone-like character; and, e) modulating a respective index in each neighborhood not identified in step d) so as to make a selected index in such neighborhood an extremum while keeping the total acoustic energy of the audio portion constant, and not modulating an index in any of those neighborhoods identified in step d).

According to still a further aspect of the present invention, a broadcast audience measurement system, in which an inaudible code added to an audio signal is read by a decoding apparatus located within a statistically sampled dwelling, comprises an encoder, a receiver, and a decoder. The encoder is arranged to add a predetermined code bit to each of a predetermined number of odd frequency bands within a bandwidth of the audio signal. The receiver is within the dwelling and is arranged to receive the encoded audio portion. The decoder has an input from the receiver, and the decoder is arranged to acquire a respective test value of the code bit from each of the frequency bands, to compare the test values, to determine that one of the test values is the code bit only if that test value is acquired from a majority of the frequency bands, and to otherwise determine that no code bit has been read.

According to another aspect of the present invention, a broadcast audience measurement system, in which an inaudible code added to an audio signal is read within a statistically sampled dwelling unit, comprises an encoding apparatus, a receiver, and a decoder. The encoding apparatus is arranged to add a code bit to a sampled long block of the audio signal, where the long block comprises a predetermined number of short blocks. Each of the short blocks has a predetermined duration that is selected to be short enough not to be perceptible to a member of a broadcast audience. The encoding apparatus is further arranged to modulate a selected frequency index in each of a plurality of frequency neighborhoods so as to make each selected index an extremum in the respective neighborhood thereof while keeping a total energy of the audio signal constant. The receiver is within the dwelling, and is arranged to acquire the encoded audio signal. The decoder is arranged to read the code from the audio signal. The decoder has an input from the receiver, and the decoder comprises a buffer memory arranged to store one of the short blocks. The buffer memory is not arranged to store a long block.

According to still aspect of the present invention, a method of encoding an audio signal comprises the following steps: a) generating a plurality of short blocks from the audio signal, wherein each of the short blocks has a duration less than a minimum audibly perceivable signal delay; b) combining the plurality of short blocks into a long block; c) transforming the long block into a spectrum comprising a plurality of independently modulatable frequency indices; and, d) modulating at least two of the indices so as to make one of the indices an extremum while keeping the total energy of a neighborhood of the modulated indices substantially constant.

According to yet aspect of the present invention, a method of reading a code element from an audio signal comprises the following steps: a) transforming at least a portion of the audio signal into spectral data spanning a predetermined number of frequency bands having a plurality of frequency neighborhoods; b) determining, for each of the neighborhoods, if one of the frequency indices is modulated; and, c) assigning a transmitted code value to the code element if, in a majority of the neighborhoods, the respective modulated frequency index is an index selected for inclusion in the audio signal.

BRIEF DESCRIPTION OF THE DRAWING

These and other features and advantages will become more apparent from a detailed consideration of the invention when taken in conjunction with the drawings in which.

DETAILED DESCRIPTION OF THE INVENTION

Figure 1:
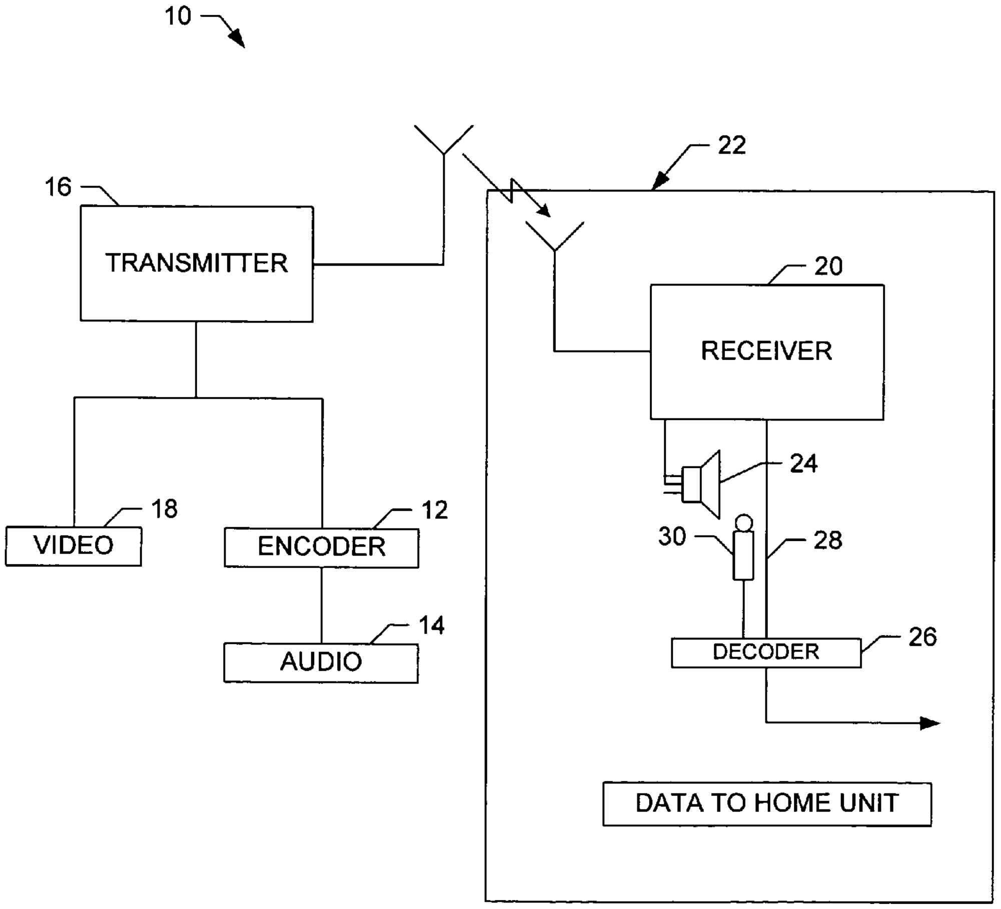
FIG. 1 is a schematic depiction of a broadcast audience measurement system employing a program identifying code added to the audio portion of a composite television signal.

Audio signals are usually digitized at sampling rates that range between thirty-two kHz and forty-eight kHz. For example, a sampling rate of 44.1 kHz is commonly used during the digital recording of music. However, digital television ("DTV") is likely to use a forty eight kHz sampling rate. Besides the sampling rate, another parameter of interest in digitizing an audio signal is the number of binary bits used to represent the audio signal at each of the instants when it is sampled. This number of binary bits can vary, for example, between sixteen and twenty four bits per sample. The amplitude dynamic range resulting from using sixteen bits per sample of the audio signal is ninety-six dB. This decibel measure is the ratio of the square of the highest audio amplitude ($2^{16}$=65536) to the square of the lowest audio amplitude ($1^2=1$). The dynamic range resulting from using twenty-four bits per sample is 144 dB. Raw audio, which is sampled at the 44.1 kHz rate and which is converted to a sixteen-bit per sample representation, results in a data rate of 705.6 kbits/s.

Compression of audio signals is performed in order to reduce this data rate to a level which makes it possible to transmit a stereo pair of such data on a channel with a through-put as low as 192 kbits/s. Audio compression is typically accomplished by transform coding. A block of audio consisting of samples, for example, may be decomposed, by application of a Fast Fourier Transform or other similar frequency analysis process, into a spectral representation. In order to prevent errors that may occur at the boundary between one block of audio and the previous or subsequent block of audio, overlapping blocks of audio are commonly used to produce the samples. In one such arrangement where 1024 samples per overlapped block are used, a block includes 512 "old" audio samples (i.e., audio samples from a previous block) and 512 "new" or current audio samples. The spectral representation of such a block is divided into critical bands, where each band comprises a group of several neighboring frequencies. The power in each of these bands can be calculated by summing the squares of the amplitudes of the frequency components within the band.

Audio compression is based on the following principle of masking: in the presence of high spectral energy at one frequency (i.e., the masking frequency), the human ear is unable to perceive a lower energy signal if the lower energy signal has a frequency (i.e., the masked frequency) near that of the higher energy signal. The lower energy signal at the masked frequency is called a masked signal. A masking threshold, which represents either (i) the acoustic energy required at the masked frequency in order to make it audible or (ii) an energy change in the existing spectral value that would be perceptible, can be dynamically computed for each band. The frequency components in a masked band can be represented in a coarse fashion by using fewer bits based on this masking threshold. That is, the masking thresholds and the amplitudes of the frequency components in each band are coded with a smaller number of bits that constitute the compressed audio. Decompression reconstructs the original signal based on these data.

It may be noted that the masking threshold depends to some extent on the nature of the sound being masked. Tone-like sounds, in which only one, or a few, frequencies are present in the acoustic spectrum, present special masking problems that are not encountered when dealing with a broad-band acoustic signal.

Thus, a signal, that would be masked if added to a passage of speech, might be audible to a listener if added to a passage of music having the same acoustic energy.

A television audience measurement system 10 shown in FIG. 1 is an example of a system in which the present invention may be used. The television audience measurement system 10 includes an encoder 12 that adds an ancillary code to an audio signal portion 14 of a broadcast program signal. Alternatively, the encoder 12 may be provided, as is known in the art, at some other location in the program signal distribution chain. A transmitter 16 transmits the encoded audio signal portion along with a video signal portion 18 of the program signal.

When the encoded signal is received by a receiver 20 located at a statistically selected metering site 22, the audio signal portion of the received program signal is processed to recover the ancillary code, even though the presence of that ancillary code is imperceptible to a listener when the encoded audio signal portion is supplied to speakers 24 of the receiver 20. To this end, a decoder 26 is connected either directly to an audio output 28 available at the receiver 20 or to a microphone 30 placed in the vicinity of the speakers 24 through which the audio is reproduced. The received audio signal can be either in a monaural or stereo format.

As disclosed in the '397 application and in the '425 application, audio blocks may comprise 512 samples of an audio stream sampled at a 48 kHz sampling rate. The time duration of such a block is 10.6 ms. Because two blocks are buffered, this arrangement comprises a total delay of about 22 ms, which would be perceptible to a viewer as a loss of synchronization between the video and audio signals. To avoid losing synchronization, a compensating delay is introduced into the video signal. Because it is preferable to do without such compensating delay, the encoder 12 implements encoding as represented by the flow chart of FIG. 2 in order to avoid loss of video/audio synchronization while at the same time avoiding the use of a compensation delay circuit.

The encoding implemented by the encoder 12 reduces the audio encoding delay to an imperceptible 5.3 milliseconds by structuring a complete, or "long", code block as a sequence of overlapping short blocks that can be processed in a pairwise fashion with correspondingly smaller buffers and that are only ½ as long as the blocks used in the '397 and '425 applications.

According to the '397 application and the '425 application, a spectral analysis of a sampled interval of the audio signal that is long enough to form a block of 512 samples collected at a sampling rate of 48 kHz yields frequency "lines" separated from one another by 93.75 Hz. In these applications, a neighborhood is a set of five consecutive frequency lines covering a neighborhood bandwidth of 468.75 Hz that lies within a selected portion of the overall bandwidth of the audio portion being encoded. A binary data bit, either a '0' or '1', is encoded by changing (preferably by boosting) the amplitude of one of the frequencies in the neighborhood such that it becomes a local extremum (i.e., a maximum in the preferred case, although the local extremum could alternatively a minimum). Another frequency in the same neighborhood is changed in the alternate sense (i.e., preferably attenuated) in order to maintain the overall energy within the band at a constant level, a practice that is referred to herein as "energy exchange encoding". It has been found that the 468.75 Hz neighborhood bandwidth required for a code block is great enough that codes may be subject to interference effects when two frequencies in a single neighborhood undergo different amounts of change.

In a preferred system of the present invention, a much longer "long block" sampling interval (8192 samples taken at 48 kHz) is used. This longer sampling interval reduces the spacing between spectral lines to 5.85 Hz. As will be described in greater detail hereinafter, this preferred system writes an energy-exchange code bit in a frequency neighborhood containing eight adjacent frequency indices. Thus, this frequency neighborhood requires a bandwidth of less than 50 Hz. This selection of sampling rate, number of samples in a sampling interval, and number of frequency indices in a neighborhood leads to a very small frequency difference in a neighborhood and thereby offers an interference-resistant code having a high degree of invulnerability to narrow-band interference effects.

Encoding by Spectral Modulation

Figure 2:
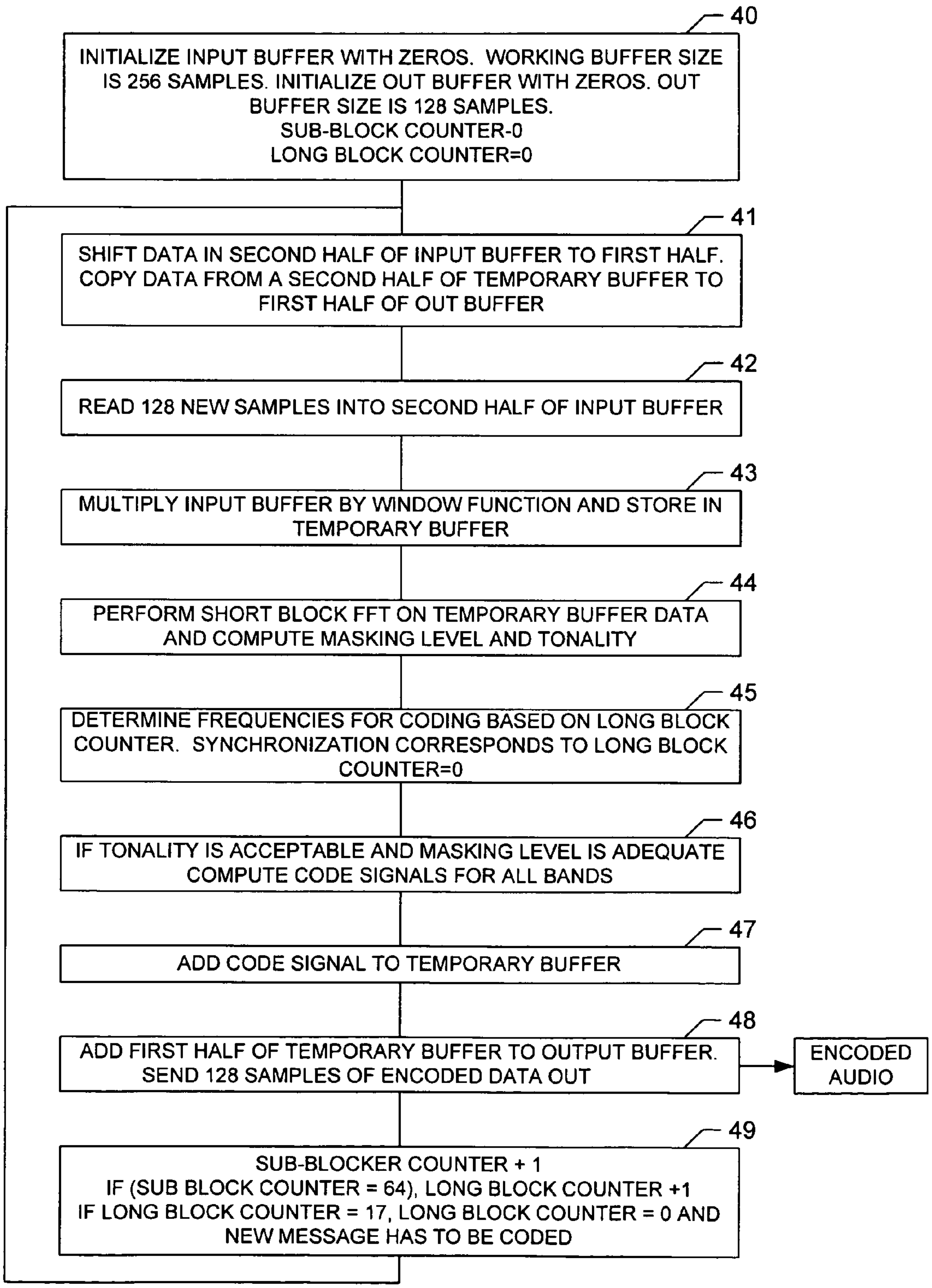
FIG. 2 is a flow chart depicting an encoding process of the present invention; and, FIG. 3 is a flow chart depicting a decoding process of the present invention.

At a step 40 of the encoding implemented by the encoder 12 and shown in FIG. 2, an In Buffer having 256 memory locations is initialized by setting all of its memory locations to zero. Also, an Out Buffer having 128 memory locations is initialized by setting all of its memory locations to zero. Moreover, a sub-block counter and a long-block counter are both set to zero. At a step 41, data is shifted from the second half of the In Buffer to its first half, and data is copied from the second half of a Temporary Buffer to the first half of the Out Buffer.

A short block is constructed at a step 42 by reading 128 samples of new data from the audio signal portion 14 into the second half of the In Buffer which combines these 128 new samples with the last 128 samples of a previous block stored in the first half of the In Buffer as a result of the step 41. In order for the encoder 12 to embed a digital code in an audio data stream in a manner compatible with compression technology, the encoder 12 should preferably use frequencies and critical bands that match those used in compression. The short block length $N_s$ of the audio signal that is used for coding may be chosen such that, for example, $N_S=N_1/j$, where j is an integer, and where $N_S$ is the length in samples of a long block. A suitable value for $N_S$ is 256, for example, and a suitable value for $N_1$ is 8192, for example. The short block itself is constructed from the last 128 samples of a previous block and the 128 samples of new data read at the step 42 of FIG. 2. The samples may be derived from the audio signal portion 14 by the encoder 12 such as by use of an analog to digital converter.

The amplitude of the audio signal within a short block may be represented by the time-domain function v(n), where n is the sample index. The time-domain function v(n) is converted to a time value by multiplication by the sample interval at a step 43. To this end, a "window function" is defined according to the following equation:

$$w(n) = \frac{1 - \cos\left(\frac{2\pi n}{N_S}\right)}{2} \tag{1}$$

and is applied to v(n) at the step 43 by multiplication to obtain a windowed signal v(n)w(n) which is stored in the Temporary Buffer. At a step 44, a Discrete Fourier Transform F(u) of v(n)w(n), where u is a frequency index, is computed. This Discrete Fourier Transform can be performed using the well-known Fast Fourier Transform (FFT) algorithm.

The frequencies resulting from the Fourier Transform are indexed in the range −127 to +127, where an index of 127 corresponds to exactly half the sampling frequency $f_S$. Therefore, for a forty-eight kHz sampling frequency, the highest index would correspond to a frequency of twenty-four kHz. Accordingly, for purposes of this indexing, the index closest to a particular frequency component $f_j$, where frequency is measured in kHz, resulting from the Fourier Transform is given by the following equation:

$$j = \frac{128 f_j}{24} \tag{2}$$

where equation (2) is used in the following discussion to relate a frequency $f_j$ to its corresponding short-block index j. As noted above, in the preferred coding arrangement, sequential indices calculated for a short block are separated from each other by a frequency of 187.5 Hz. Correspondingly, in considering a long block made up of 64 sub-blocks of 128 samples each (where the sub-blocks are processed in pairs having 256 samples), an equation relating the long block index J to a high resolution spectral frequency $f_J$ in kHz is given by the following:

$$J = \frac{4096 f_J}{24} \tag{3}$$

From equations (2) and (3), it is clear that J=32j for frequencies which are common to both the high (long block) and low (short block) resolution spectra.

In the preferred high resolution encoding arrangement of the present invention, five frequency bands are selected for use in a "voting" arrangement to be discussed in greater detail hereinafter. For each of the selected frequency bands, a high resolution neighborhood of eight long block indices $J_L=J_S-4$, $J_S-3$, $J_S-2$, $J_S-1$, $J_S$, $J_S+1$, $J_S+2$, $J_S+3$ is defined about a central short block index $j_S$ with $J_S=32j_S$. In one such embodiment, the selected frequencies and indices are shown in the following table:

| Band Index | Short Block Central index | Long Block Central Index | Long Block Range |
|---|---|---|---|
| 0 | 7 | 224 | 220–227 (1287 Hz–1328 Hz) |
| 1 | 11 | 352 | 348–355 (2035 Hz–2077 Hz) |
| 2 | 15 | 480 | 476–483 (2785 Hz–2826 Hz) |
| 3 | 19 | 608 | 604–611 (3533 Hz–3574 Hz) |
| 4 | 23 | 736 | 732–739 (4282 Hz–4323 Hz) |

It may be noted that each long block in the arrangement shown in the above exemplary table is set up to define neighborhoods having eight long block indices. It will be recognized that different numbers of indices could be used. Adding indices has the effect of increasing the numerical range that can be accommodated in a single block, but it also has the effect of increasing the frequency span of a block, thereby rendering the code more susceptible to interference effects. Let it be assumed that a long block L consists of 8192 samples made up of 64 sub-blocks, with each sub-block having 128 new samples. A 256-sample short block is constructed from adjacent sub-blocks by the use of the window function of equation (1). Thus, L consists of a sequence of sixty four overlapped short blocks, each of which has 256 samples. These short blocks may conveniently by indexed as $S_i$, where the short block index i ranges from 0 to 63.

A masking analysis of the sort conventionally used in compression algorithms is preferably applied at the step 44 to the short blocks in order to determine the maximum change in energy $E_b$ or in the masking energy level that can occur at any critical frequency band without making the modulation perceptible to a listener. These critical frequency bands, determined by experimental studies carried out on human auditory perception, may vary in width from single frequency bands at the low end of the spectrum to bands containing ten or more adjacent frequencies at the upper end of the audible spectrum. In the psycho-acoustic modeling scheme used in the MPEG-AAC audio compression standard ISO/IEC 13818-7:1997, for example, critical band eighteen includes two frequencies with indexes 19 and 20 of a short audio block. The acoustic energy in each critical band influences the masking energy of its neighbors. Algorithms for computing the masking effect are described in the standards document such as ISO/IEC 13818-7:1997. These analyses may be used to determine for each audio block the masking contribution due to "tonality" as well as "noise" like features of the audio spectrum. The tonality index computed by these algorithms at the step 44 provides a useful tool for determining circumstances under which a sub-block may produce audible degradation when encoded. The analysis can also be used to determine, on a per critical band basis, the amplitude of a time domain code signal that can be added without producing any noticeable audio degradation. Thus, for a short block frequency index j, belonging to a critical band with masking energy $E_j$, the maximum amplitude of a code signal is given by the following equation:

$$M_j = 128\sqrt{E_j} \tag{4}$$

where 128 is a factor required to convert from a spectral domain to the time domain.

A preferred code waveform is constructed using long block indices that are very near to the central index of the corresponding short block for a selected band. For example, if a sub-block $S_m$ with a sub-block index m and a coding band b is considered, and if a spectral frequency having a long block index of $J_b$ is enhanced, an appropriate code waveform will have 256 samples, which can be denoted as $C_b(p)$, where the index p runs from 0 to 255. In a preferred embodiment, each of these components is selected to follow the relationship:

$$C_b(p) = A_b\cos\left(\phi_m + \frac{2\pi J_b p}{8192}\right) + k_b A_b \cos\left(\pi + \phi_j + \frac{2\pi j_b p}{256}\right) \tag{5}$$

where $A_b$ is a nominal code amplitude level, $J_b$ is an index in the long block frequency space, $j_b$ is the central index of the corresponding short block, $\phi_m$ is given by the following equation:

$$\phi_m = \frac{2\pi J_b m 128}{8192} \tag{6}$$

$\phi_m$ is the starting phase angle for sub-block m, and $\phi_j$ is the phase angle of the short block frequency index $j_b$ obtained from the Fourier Transform analysis. The quantity $\phi_m$ ensures that the code component having a frequency index of $J_b$ is in phase in all 64 blocks constituting the long block. It may be noted that, in order to simplify the representation, a multiplication of the code signal with a window function (not shown) may be implemented.

The above choice for a code waveform provides an energy exchange coding feature. For a given large block index $J_b$, the first cosine term in equation (5) represents an added energy. The corresponding short block index $j_b$ term, because of the change in phase angle of $\pi$, subtracts a compensating amount of energy with the assumption that the spectral energy at $j_b$ represents the overall energy in the coding band b and includes all of the high resolution coding frequencies in the band.

It should be noted that each high resolution frequency component, such as $J_b$, influences not only the spectral amplitude at $j_b$ but also its neighbors. The most significant impact is on the immediate neighbors $j_b-1$ and $j_b+1$. The constant kb with a value in the range 0 to 0.8 is used to control the extent to which a single index $j_b$ compensates for the code signal.

The window function applied at the step 43 causes further interaction among the short block frequency indexes. Because the high resolution frequencies are close to each other, these amplitude changes are not perceptible. Because of the encoding operation, the desired long block frequency with index $J_b$ is enhanced relative to its neighbors in band. For example, if a long block index of 223 is selected, where the corresponding short block central index is seven, and the code energy for all 64 blocks is calculated, a component with frequency index 223 has a higher energy level than the other indices in the neighborhood from 220 to 227.

The nominal code amplitude level $A_b$ is chosen such that it is the lowest value that permits successful extraction of the embedded code during decoding. For most sub-blocks, the nominal code amplitude level $A_b$ is expected to be well below the corresponding masking amplitude level $M_j$. However, in cases where $M_j$ is not greater than $A_b$, $M_j$ replaces $A_b$ in equation (5).

In preferred embodiments of the encoding system of the present invention, signal analyzers or signal analyzing algorithms are used to examine each encodable neighborhood of each short block to see if the signal being encoded has a tone-like character within that neighborhood. The tonality index calculated at the step 44 by the masking algorithm described in ISO/IEC 13818-7:1997, for example, provides such a measure. A purely tonal audio block is expected to have a tonality index of 1.0, whereas a "noise-like" block has a tonality index close to 0. If the tonality index for the bands used in coding has a value exceeding a tonal threshold, the encoding operation is suspended for that sub-block. (See the discussion below regarding step 46.) It is noted that, even if several sub-blocks are tonal, coded data can still be successfully retrieved because there are 64 sub-blocks in each long block. It is the spectrum of the long block that is analyzed during decoding.

A preferred encoding arrangement of the invention uses a redundant transmission scheme to make the system more robust. As depicted in the table shown above, five different frequency bands are defined in the exemplary system. The coding arrangement disclosed above was described with respect to only one of these bands. That is, the five bands are essentially independent of each other so that a code symbol can be sent in multiple bands at any given time in the interest of providing redundant transmission.

One of the advantages of the encoding method described above is that the processing uses only 256 samples at each stage, of which 128 are new samples and 128 are carried over from the prior processing step. Thus, at a selected sampling rate of 48 kHz, the total buffer capacity required to hold the samples in a "double buffer" is 256 and the corresponding time duration is 256/48000=5.3 milliseconds. As is known to those skilled in the arts of perceptual psychology, a loss of synchronization of less than about 10 msec between two portions (e.g., left and right stereo channel) of a composite audio signal or between an audio and a video portion of a composite television signal is not perceptible. Thus, the encoding method of the present invention does not require introducing a compensating delay in another portion of the signal. When used for television audience research purposes, the present system has the advantage that it can be used without a video delay circuit and without disturbing the viewer with a perceptible loss of synchronization.

In order to design a practical encoding scheme, it is essential to develop a synchronization method that will allow the decoding system to determine the start of a new message. As is often done in encoded messaging systems, a preferred system of the invention defines a synchronization block having a unique structure that differentiates it from other encoded blocks. At a step 45, therefore, a synchronization block consisting of 8192 samples is selected when the long block counter has a count of zero such that the synchronization block has the following characteristics: in Band 0, index 220, which is the first frequency line in that neighborhood, is enhanced; in Band 1, the second frequency line, index 349, is enhanced; in Band 2, the third frequency line, index 478, is enhanced; in Band 3, the fourth frequency line, index 607, is enhanced; and, in Band 4, the fifth frequency line, index 736, is enhanced. When the decoder analyzes a long block by comparing each enhanced frequency index with the respective index selected for enhancement in a synchronization block and finds a match in at least three of the five frequency bands, the system determines that a potential synchronization block has been detected, and interprets the long blocks following a synchronization block as the actual message data.

As noted above, in discussing the blocks selected for an exemplary system and shown in the above table, each long block comprises a set of eight indices that can be modulated to form a code. In a television audience measurement application of interest to the inventor, a complete encoded message may comprise forty-eight bits consisting of a sixteen bit Station Identifier (SID) and a thirty-two bit time stamp (TS). To match this message to the selected set of indices, the forty-eight bits of data may be grouped into sixteen three-bit sets. The decimal value of each of these three-bit sets can range from zero to seven so that each of the three-bit sets can be encoded by using the selected long blocks. In one preferred arrangement, the system encodes a value of k (where k is in the range of zero to seven) by modulating the $k^{th}$ available index. In this arrangement, for example, to send a code group having a value=five, the $6^{th}$ index in each band (i.e., indices 225, 353, 481, 609, and 737) is selected at the step 45 for enhancement. In this embodiment, a forty-eight bit data packet can be transmitted as one long synchronization block followed by sixteen long data blocks. For the choice of code blocks and sampling frequency disclosed above, sending these seventeen long blocks requires 2.89 seconds. This arrangement provides a clear distinction from the synchronization block, which has a different index enhanced in each band.

More generally speaking, each of a plurality of possible code bits has an index pattern uniquely associated with it, and decoding a bit comprises comparing each of plurality of enhanced indices with ones of the index patterns to determine if a majority of the enhanced indices match with one of the predetermined patterns. The exemplary embodiment recited above is both conceptually straightforward and robust, but may lead to an audible beat phenomenon because each code frequency is separated from its central short block frequency by the same value in all the coding bands. In the case of a code bit of value five, this constant difference frequency is 5.85 Hz, which corresponds to an index difference of one. In another preferred embodiment, this problem is overcome at the step 45 by choosing as the index pattern a pre-determined pseudo-random combination of frequency indexes for each band. Thus, for example, a value of five could be coded by using the following frequency indexes in the five bands: 225, 355, 476, 607, and 737. The beat phenomenon is substantially decreased by this change.

This arrangement of sending the same data in each of five bands at the same time fits well with the masking algorithms discussed above. That is, one can select a masking algorithm that suspends coding in one or more of the bands, but that continues to encode in the other ones of the bands.

Once the frequencies have been selected at the step 45, the signal at these frequencies is enhanced at the step 46 assuming that the masking level and the tonality as indicated by the tonality index are acceptable. The samples v(n)w(n) stored in the Temporary Buffer are modified according to equations (5) and (6) and, at a step 47, the code signal is added to the Temporary Buffer. At a step 48, the first half of the Temporary Buffer is added to the Out Buffer, and the 128 samples in the Out Buffer are passed to the transmitter 16 as encoded data.

At a step 49, the sub-block counter is incremented by one and, if the sub-block counter is equal to 64, the long block counter is incremented by one. No other sub-blocks are encoded until the long block counter is incremented. When the long block counter is equal to 17, then a complete code message (a synchronization block and sixteen data blocks) has been passed to the transmitter 16 and the long block counter is reset to zero to begin encoding a new message. If the sub-block counter is not equal to 64, or after the long block counter has been reset to zero, program flow returns to the block 41.

Decoding the Spectrally Modulated Signal

A preferred system provides an audio signal acquisition arrangement at a receiving location. This location, for example, may be within the statistically selected metering site 22. In some instances, the embedded digital code can be recovered from the audio signal available at the audio output 28 of the receiver 20. When such an output is available, it provides a relatively high quality signal source. However, many receivers 20 do not have the audio output 28, which constrains the audience research system operator to acquire an analog audio signal with the microphone 30 placed in the vicinity of the speakers 24. Because audience measurement systems generally have a goal of minimizing the intrusion that they make into the measured television viewing environment, the microphone 30 is preferably placed behind the receiver 20, where the quality of the signal it acquires is degraded from what would be found if the microphone 30 were placed in front of the receiver 20. This signal degradation has led to the failure of many prior art systems that attempted to read a buried code from an audio signal picked up with a microphone. However, the redundancy obtained by encoding five frequency bands as discussed above increases the likelihood that the code can be successfully recovered.

In the case where the microphone 30 is used, or in the case where the signal on the audio output 28 is analog, the decoder 26 converts the analog audio to a sampled digital output stream at a preferred sampling rate matching the sampling rate of the encoder 12. In decoding systems where there are limitations in terms of memory and computing power, a half-rate sampling could be used. In the case of half-rate sampling, each short block would consist of $N_S/2$=128 samples, and the resolution in the frequency domain (i.e., the frequency difference between successive spectral components) would remain the same as in the full sampling rate case. In the case where the receiver 20 provides digital outputs, the digital outputs are processed directly by the decoder 26 without sampling but at a data rate suitable for the decoder 26.

In a practical implementation of audio decoding, such as may be used in a home audience metering system, the ability to decode an audio stream in real-time is highly desirable. It is also highly desirable to transmit the decoded data to a remote central office. The decoder 26 may be arranged to run the decoding algorithm described below in connection with FIG. 3 on Digital Signal Processing (DSP) based hardware of the sort typically used in such applications. As disclosed above, the incoming encoded audio signal may be made available to the decoder 26 from either the audio output 28 or from the microphone 30 placed in the vicinity of the speakers 24.

Figure 3:
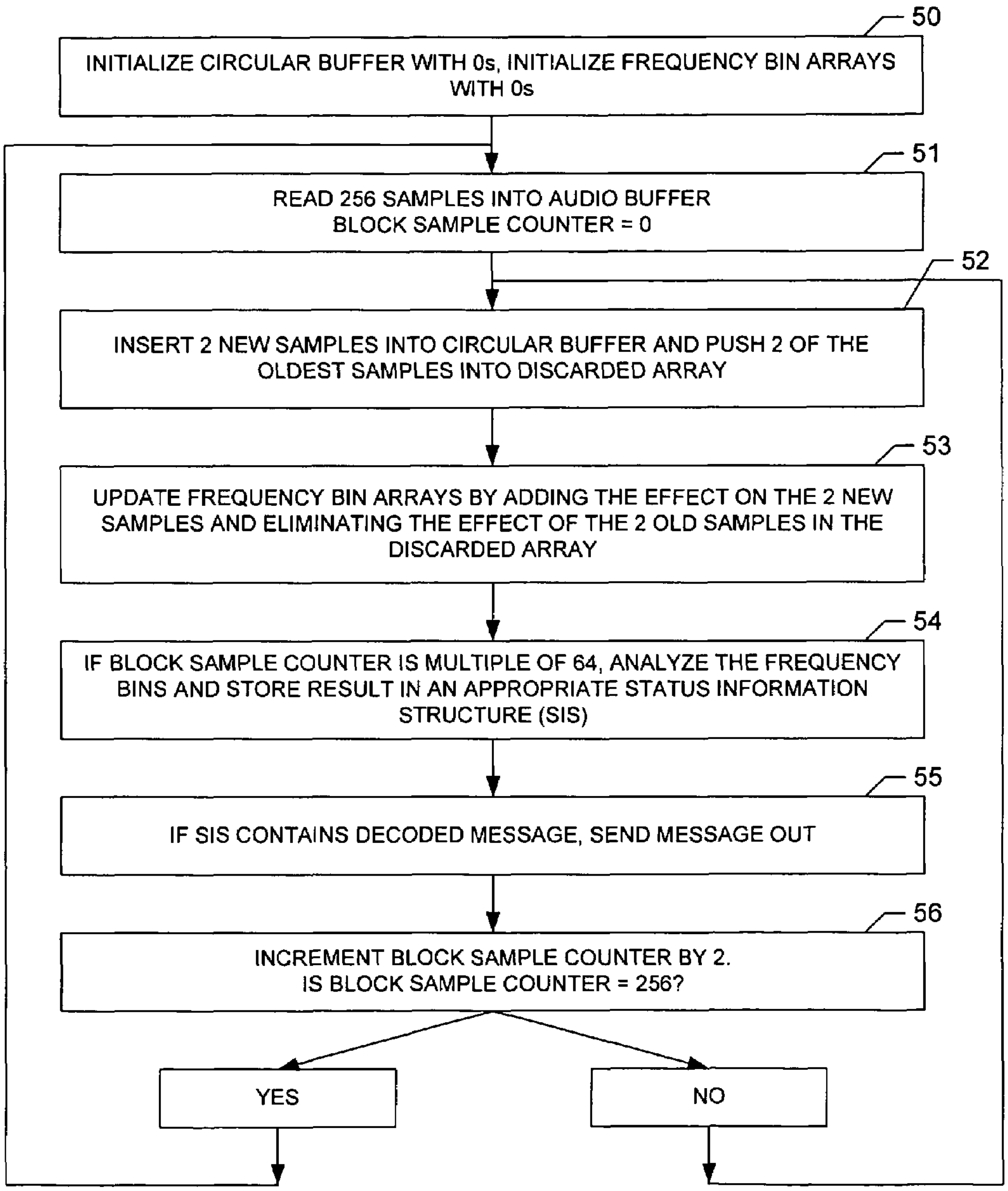

As shown by step 50 in the flow chart of FIG. 3, a circular buffer capable of storing 4096 samples is initialized by setting all of its storage locations to zero. Also, a set of frequency bins are set to zero. At a block 51, 256 samples are read into an audio buffer. Also, a block sample counter is set to zero. Before recovering the actual data bits representing code information, it is necessary to locate the synchronization block which is preferably encoded by enhancing (or diminishing) the amplitude of a unique set of frequencies. In one preferred embodiment these frequencies have indexes 220, 349, 478, 607, and 736 and each one is in a different coding band. In order to search for the synchronization block, as well as to extract data from subsequent blocks within an incoming audio stream, the circular buffer is used. The circular buffer has a sufficient size to store 4096 samples in the case of half rate sampling. This arrangement is essential in order to implement a near real-time decoding scheme based on a sliding FFT routine which forms part of the decoding algorithm shown in the flow chart of FIG. 3.

Let it be assumed that, for the audio buffer currently stored in the circular buffer, there are a spectral amplitude $B_0[J]$ and a phase angle $\phi_0[J]$ at a frequency with index J. The spectral amplitude $B_0[J]$ and the phase angle $\phi_0[J]$ represent the spectral values for the 4096 audio samples currently in the circular buffer. If two new time domain samples $v_{4094}$ and $v_{4095}$ are read from the audio buffer and are inserted into the circular buffer as indicated by a step 52 so as to replace the two earliest samples $v_0$ and $v_1$ in the circular buffer, then the new spectral amplitude $B_1[J]$ and phase angle $\phi_1[J]$ for each of the indices J are determined at a step 53 in accordance with the following equation:

$$B_1[J]\exp\phi_1[J] = B_0[J]\exp\phi_0[J] + \left(v_{4094}\exp\left(\frac{i2\pi J(4096-2)}{4096}\right)\right) + \left(V_{4095}\exp\left(\frac{i2\pi J(4096-1)}{4096}\right)\right) - \left(v_0\exp\left(-\frac{i2\pi J2}{4096}\right)\right) - \left(v_1\exp\left(-\frac{i2\pi J}{4096}\right)\right) \quad (7)$$

Thus, the spectrum of the circular buffer can be computed merely by updating the existing spectrum for the samples contained in the circular buffer according to equation (7). Even when all the spectral values—amplitude and phase—are initially set to 0 at the step 50, as new data enters the circular buffer, and as old data gets discarded, the spectral values gradually change until they correspond to the actual FFT spectral values for the data currently in the circular buffer. In order to overcome certain instabilities that may arise during computation, multiplication of the incoming audio samples by a stability factor (usually set to 0.99995) and multiplication of the discarded samples by a factor $0.99995^{2048}=0.902666$ is known to most practitioners in this field. The sliding FFT algorithm provides a computationally efficient means of calculating the spectral components of interest for the 4095 samples preceding the current sample location and the current sample itself. The frequency bins are updated at the block 53 with the results of the analysis performed according to equation (7).

If the block sample counter has a count which is a multiple of 64, the frequency bins are analyzed and the results of the analysis are stored in a Status Information Structure (SIS) as indicated in step 54 of FIG. 3. This value 64 may be used because the frequency spectrum of a long block of 4096 samples changes very little over a small number of samples of an audio stream. Even though the sliding FFT algorithm is used to update the spectral values in two sample increments, the analysis of the spectrum to locate the synchronization block and to extract data needs to be performed only every 64 samples. Thus, 4096/64=64 SIS structures are used to track the intermediate results of the decoding operation. These SIS structures are indexed as $SIS_0$, $SIS_1$, . . . $SIS_{63}$. Each SIS structure is updated at 4096 sample intervals, which corresponds to the length of a long block in the half-sampling rate case. Each SIS structure contains a synchronization flag and a data storage location. Also, the SIS includes a counter.

The search for the synchronization block is the first step in the decoding process. Let us assume that at a sample location where the SIS $SIS_k$ needs to be updated because a spectrum, which satisfies the characteristics of a synchronization block, is found. In such a spectrum, indexes 220, 349, 478, 607, 736 are enhanced and possess higher spectral power than their neighbors in the respective bands. Due to factors such as audio compression, audio degradation due to amplifier-speaker-microphone non-linearities, or ambient noise in the case of microphone based decoding systems, it is possible that not all the five bands have the desired characteristics. The redundant transmission feature described above enables detection of a long block as being a synchronization block even if only three of the five bands satisfy the criteria for a synchronization block. Once a synchronization block has been detected, a synchronization flag within the corresponding SIS structure is set to one. In a practical implementation, more than one SIS structure can have its synchronization flag set to one. Usually several adjacent SIS structures, for example, $SIS_{k-2}$, $SIS_{k-1}$, $SIS_k$, $SIS_{k+1}$, $SIS_{k+2}$, may all have synchronization flags set to one because the spectrum of a long audio block does not change rapidly.

When $SIS_k$ is analyzed 4096 samples later, the algorithm recognizes the synchronization flag and attempts to extract the first three-bit data value encoded in the spectrum. This extraction may be done by means of a voting algorithm that compares test values taken from each of the neighborhoods and that accepts a test value as the data value if the same test value is found in three out of the five band neighborhoods. In addition, if a valid data value in the range zero to seven is extracted, the counter within the SIS is incremented to show that the first member of the sixteen member message data has been extracted. The extracted three-bit datum is also stored within the structure at a corresponding data storage location. In the event a valid datum is not found either at the current location or at any one of the fifteen subsequent locations where $SIS_k$ is updated, the SIS structure's synchronization flag is reset to zero and the counter is reset to zero. These actions frees the SIS to once again look for synchronization blocks. When an SIS structure's counter increments to sixteen, it contains a full message packet consisting of forty-eight bits that could be transmitted out, as indicated in step 55 of the flow chart in FIG. 3. For example, the message packet may be transmitted to a Central Office. When this transmission is done, the synchronization flag is reset to zero and the counter is reset.

At a block 56, the block sample counter is incremented by two corresponding to the two samples read from the audio buffer to the circular buffer at the step 52. If the block sample counter does not have a count equal to 256, flow returns to the step 52 where two more samples from the audio buffer are read into the circular buffer. On the other hand, if the block sample counter does have a count equal to 256, flow returns to the step 51 where another 256 samples are inserted into the audio buffer.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A method of inserting an inaudible code into an audio signal comprising:

sampling the audio signal to generate a plurality of sub blocks of sampled audio, each of the sub blocks having a duration less than a minimum audibly perceivable signal delay;

combining the sub blocks into a plurality of partially overlapping short blocks which together comprise a long block;

individually transforming each of the short blocks into a frequency domain;

encoding each transformed short block in the frequency domain with a desired code by:

selecting at least one frequency to encode based on the desired code to insert and a predetermined coding rule;

setting an amplitude of the at least one frequency based on a masking energy associated with the at least one frequency;

setting a phase angle of the at least one frequency; and transforming the encoded short block into the time domain; and constructing an encoded time domain signal from at least two sequential ones of the encoded time domain short blocks, the phase angles of the encoded short blocks are set by setting the phase angle of the at least one frequency of a first short block to a first predetermined value, and incrementing the phase angle of each subsequent short block by a predetermined amount.

2. A method as defined in claim 1, wherein selecting at least one frequency to encode comprises selecting at least one frequency to encode in each of a plurality of frequency bands, wherein setting the amplitude of the at least one frequency comprises setting the amplitude of the at least one frequency in each of the plurality of frequency bands, and wherein setting the phase angle of the at least one frequency comprises setting the phase angle of the at least one frequency in each of the plurality of frequency bands.

3. A method as defined in claim 2, wherein the plurality of frequency bands comprises at least five frequency bands.

4. A method as defined in claim 1 further comprising decoding the long block.

5. A method as defined in claim 4, wherein decoding the long block comprises:

transforming the long block as a whole into the frequency domain; and identifying a code in the long block as the desired code if the code is carried by a majority of the frequency bands.

6. A method as defined in claim 5, wherein the code is carried by a majority of the frequency bands if a frequency identified in the predetermined coding rule is a relative maximum in a majority of the frequency bands.

7. A method as defined in claim 1, wherein the first predetermined value comprises zero degrees.

8. An apparatus for inserting an inaudible code into an audio signal comprising:

a sampler configured to sample the audio signal to generate a plurality of sub blocks of sampled audio, each of the sub blocks having a duration less than a minimum audibly perceivable signal delay;

a combiner configured to combine the sub blocks into a plurality of partially overlapping short blocks which together comprise a long block;

a transformer configured to individually transform each of the short blocks into a frequency domain;

an encoder configured to encode each transformed short block in the frequency domain with a desired code by:

selecting at least one frequency to encode based on the desired code to insert and a predetermined coding rule;

setting an amplitude of the at least one frequency based on a masking energy associated with the at least one frequency;

setting a phase angle of the at least one frequency; and transforming the encoded short block into the time domain, wherein the encoder is configured to construct an encoded time domain signal from at least two sequential ones of the encoded time domain short blocks, the phase angles of the encoded short blocks are set by setting the phase angle of the at least one frequency of a first short block to a first predetermined value, and incrementing the phase angle of each subsequent short block by a predetermined amount.

9. An apparatus as defined in claim 8, wherein the encoder is configured to select at least one frequency to encode in each of a plurality of frequency bands, to set the amplitude of the at least one frequency in each of the plurality of frequency bands, and to set the phase angle of the at least one frequency in each of the plurality of frequency bands.

10. An apparatus as defined in claim 9, wherein the plurality of frequency bands comprises at least five frequency bands.

11. An apparatus as defined in claim 8 further comprising a decoder configured to decode the long block.

12. An apparatus as defined in claim 11, wherein the decoder comprises:

a transformer configured to transform the long block as a whole into the frequency domain; and an identifier configured to identify a code in the long block as the desired code if the code is carried by a majority of the frequency bands.

13. An apparatus as defined in claim 12, wherein the code is carried by a majority of the frequency bands if a frequency identified in the predetermined coding rule is a relative maximum in a majority of the frequency bands.

14. An apparatus as defined in claim 8, wherein the first predetermined value comprises zero degrees.

* * * * *